(12) United States Patent  (10) Patent No.: US 8,413,820 B2
Steadman et al.  (45) Date of Patent: Apr. 9, 2013

(54) RACK

(76) Inventors: David Lee Steadman, Applecross (AU); Ronald James Collicott, Mandurah (AU)

( * ) Notice: Subject to any disclaimer, the term of this patent is extended or adjusted under 35 U.S.C. 154(b) by 0 days.

(21) Appl. No.: 10/593,739

(22) PCT Filed: Mar. 21, 2005

(86) PCT No.: PCT/AU2005/000405
§ 371 (c)(1),
(2), (4) Date: Jun. 25, 2007

(87) PCT Pub. No.: WO2005/090148
PCT Pub. Date: Sep. 29, 2005

(65) Prior Publication Data
US 2007/0256989 A1  Nov. 8, 2007

(30) Foreign Application Priority Data
Mar. 19, 2004  (AU) .............................. 2004901463

(51) Int. Cl.
*A47F 7/04*  (2006.01)
(52) U.S. Cl. ............................................ 211/21; 211/19
(58) Field of Classification Search ............... 211/21, 211/17, 18, 19, 20, 181.1, 104
See application file for complete search history.

(56) References Cited

U.S. PATENT DOCUMENTS

| | | | | |
|---|---|---|---|---|
| 256,936 A * | 4/1882 | Wicksteed | ........................ | 211/21 |
| 322,057 A * | 7/1885 | Hart | ................ | 211/21 |
| 516,571 A * | 3/1894 | Moulton | ........................ | 211/21 |
| 567,625 A * | 9/1896 | Waterman | ........................ | 211/21 |
| 570,465 A * | 11/1896 | Dilley et al. | ........................ | 211/19 |
| 577,663 A * | 2/1897 | Peace | ................ | 211/21 |
| 581,585 A * | 4/1897 | Hirschman, Sr. et al. | ........ | 211/21 |
| 590,773 A * | 9/1897 | Pruden | ............. | 211/19 |
| 593,728 A * | 11/1897 | Pruden et al. | .................. | 211/19 |
| 598,547 A * | 2/1898 | White | ........................ | 211/21 |
| 615,264 A * | 12/1898 | DuPont | ........................ | 211/19 |
| 619,344 A * | 2/1899 | Pyott, Jr. | ........................ | 211/18 |
| 625,657 A * | 5/1899 | Elliott | ........................ | 604/104 |
| 648,234 A * | 4/1900 | Brown | ........................ | 211/19 |
| 679,794 A * | 8/1901 | Sweet | ........................ | 211/19 |
| 2,706,049 A * | 4/1955 | Andrews | ........................ | 224/482 |

(Continued)

FOREIGN PATENT DOCUMENTS

AU  654800 B  11/1994
AU  200045161 A1  1/2001

(Continued)

OTHER PUBLICATIONS

European Search Report from EP 05 714 277.0 dated Jul. 12, 2010.

*Primary Examiner* — Darnell Jayne
*Assistant Examiner* — Stanton L Krycinski
(74) *Attorney, Agent, or Firm* — Merchant & Gould P.C.

(57) ABSTRACT

A rack (10) intended in use to be supported from an upstanding support, the rack comprising a base (12) adapted to be fixed to the support, a support member (14) connected to the base to be pivotable about a first axis which is generally level, to be moveable between a first position, at which it is adjacent to the support and a second position at which it extends laterally from the support, the support member being adapted to receive and support an item when in its second position.

41 Claims, 7 Drawing Sheets

U.S. PATENT DOCUMENTS

| | | | |
|---|---|---|---|
| 2,922,683 A | | 1/1960 | Schmertz |
| 3,116,836 A | * | 1/1964 | McCauley ................. 211/21 |
| 3,785,500 A | | 1/1974 | Kennelly |
| 3,883,002 A | | 5/1975 | Moore |
| 4,352,432 A | * | 10/1982 | Smith ........................ 211/19 |
| 5,246,120 A | * | 9/1993 | Walker ...................... 211/19 |
| 5,505,318 A | * | 4/1996 | Goff ...................... 211/90.03 |
| 5,702,007 A | * | 12/1997 | Fritz et al. ................. 211/17 |
| 5,749,474 A | * | 5/1998 | Woodcock ................. 211/18 |
| 6,164,465 A | * | 12/2000 | Schroeder ............... 211/85.7 |
| 6,216,882 B1 | | 4/2001 | Struunk et al. |
| 6,755,599 B1 | * | 6/2004 | Plyler ...................... 410/30 |
| 7,240,816 B2 | * | 7/2007 | Tsai ........................ 224/501 |
| 2007/0256989 A1 | * | 11/2007 | Steadman et al. ......... 211/21 |

FOREIGN PATENT DOCUMENTS

| | | |
|---|---|---|
| CH | 281315 | 6/1952 |
| FR | 2 626 899 | 8/1989 |
| FR | 2 684 634 | 6/1993 |
| GB | 2 317 599 | 1/1998 |

\* cited by examiner

RACK

FIELD OF THE INVENTION

This invention relates to a bicycle rack for receiving and supporting a bicycle from an upstanding support.

BACKGROUND

The storage of bicycles can present a problem in regard to its storing them in a manner which is convenient. With the increased degree of medium density living the convenient storage of a bicycle can present a problem.

DISCLOSURE OF THE INVENTION

Accordingly, the invention resides in a bicycle rack intended in use to be supported from a support, the rack comprising a base adapted to be fixed to the support, a support member having an outer and inner edge, the inner edge of the support member connected to the base to enable the support member to be pivotable about a first axis which in use is to be generally level, to be moveable between a first position, at which it is adjacent to the support and a second position at which it extends laterally from the support, the support member being adapted to receive and support a portion of the wheel of a bicycle between the edges when the support member is in its second position.

According to one embodiment, support member is pivotable from the base about a generally upright axis.

According to a preferred feature of the invention, the support member is provided with a slot shaped first space between the inner edge and the outer edge, wherein the first space is configured to receive the portion of the wheel. According to a preferred feature of the invention, the outer edge of the support member defines the outer end of the first space. According to a further preferred feature of the invention, the outer end of the first space is closed. According to a further preferred feature of the invention, the outer edge of the support member defines the closed outer end of the first space and the outer edge provides a guide and support surface for the wheel on its movement into and out of the first space. According to a preferred feature of the invention the upper surface of the outer edge has a concave profile. According to a preferred feature of the invention the inner end of the first spacer is defined by a transverse surface. According to a preferred feature of the invention, the transverse surface is provided by a cross member extending across the inner end of the first space.

According to a preferred feature of the invention, the rack further comprises a brace member, the brace member being pivotally supported from the base for pivotable movement about a second axis, the first and second axes being parallel and spaced from each other, the brace member being moveable with the support member such that, when the support member is in its second position, the brace member provides support to the support member. According to a further preferred feature of the invention, the support member and brace member are interrogated outward of their pivotable mountings such that movement of the support member causes the pivotable movement of the brace member.

According to a preferred feature of the invention, the brace member is provided with a second space which cooperates with the first space defined by the support member to provide a combined space which is configured to receive the portion of the wheel, wherein the second space provides an upright extent to the combined space while the first space provides a lateral extent to the combined space.

According to one embodiment, the rack further includes a storage shelf, the storage shelf being supported from a side of the support member to extend transversely outward from the support member.

The invention will be more fully understood in the light of the following description of several specific embodiments.

BRIEF DESCRIPTION OF THE DRAWINGS

The description is made with reference to the accompanying drawings of which.

DETAILED DESCRIPTION OF THE SPECIFIC EMBODIMENTS

Each of the embodiments comprises a rack 10 which in use is to be supported from an upstanding support such as a wall and is intended to receive a bicycle whereby, when the rack is not in use, it can be collapsed so as to minimise obstruction. In addition in locating a bicycle into and out of engagement with the rack according to each of the embodiments the user is not required to lift the bicycle bodily into and out of position if the rack has been located at the correct height from the ground.

Figure 1:
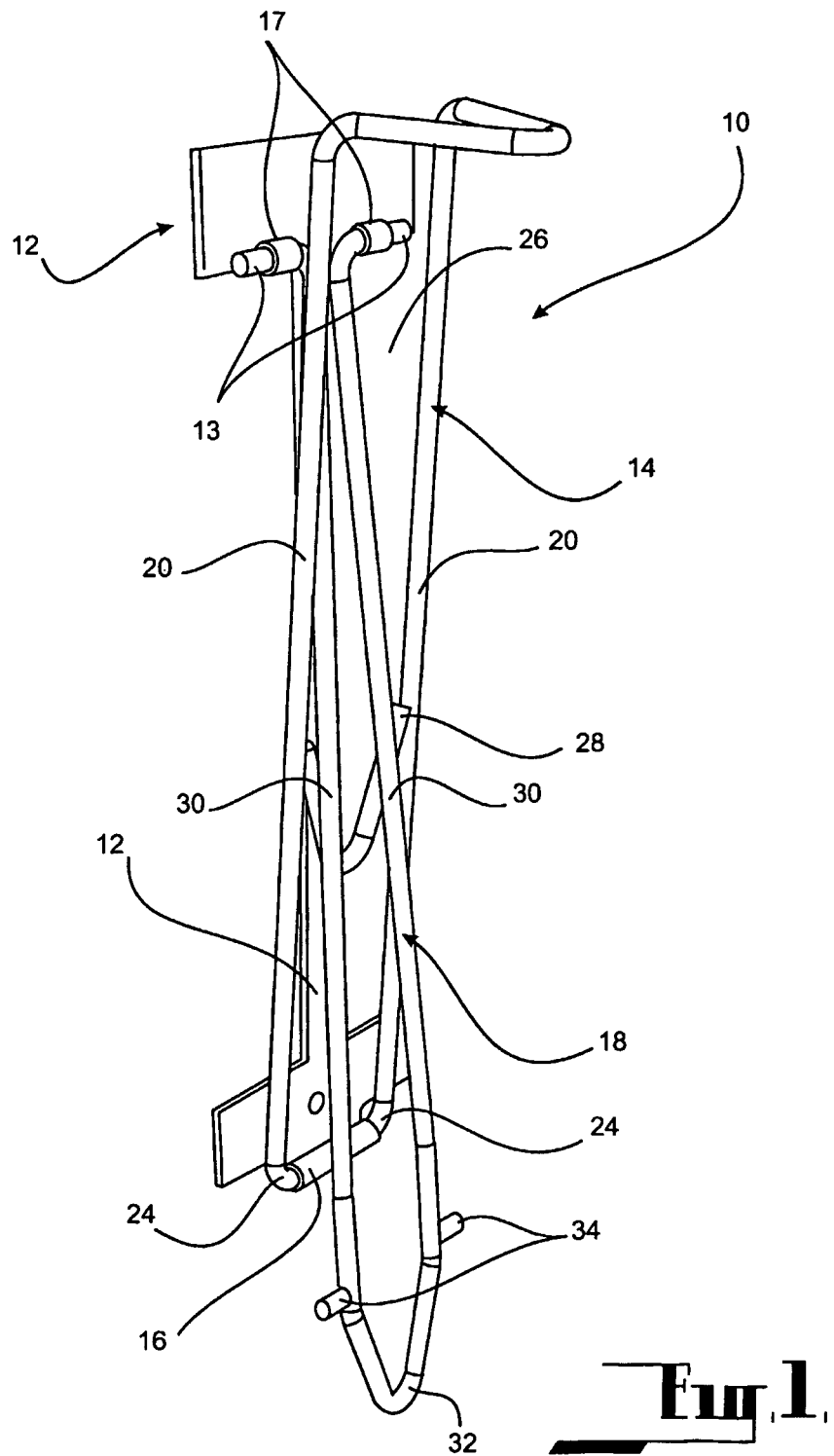
FIG. 1 is a perspective elevation view of bicycle rack according to the first embodiment in a collapsed condition.
Figure 2:
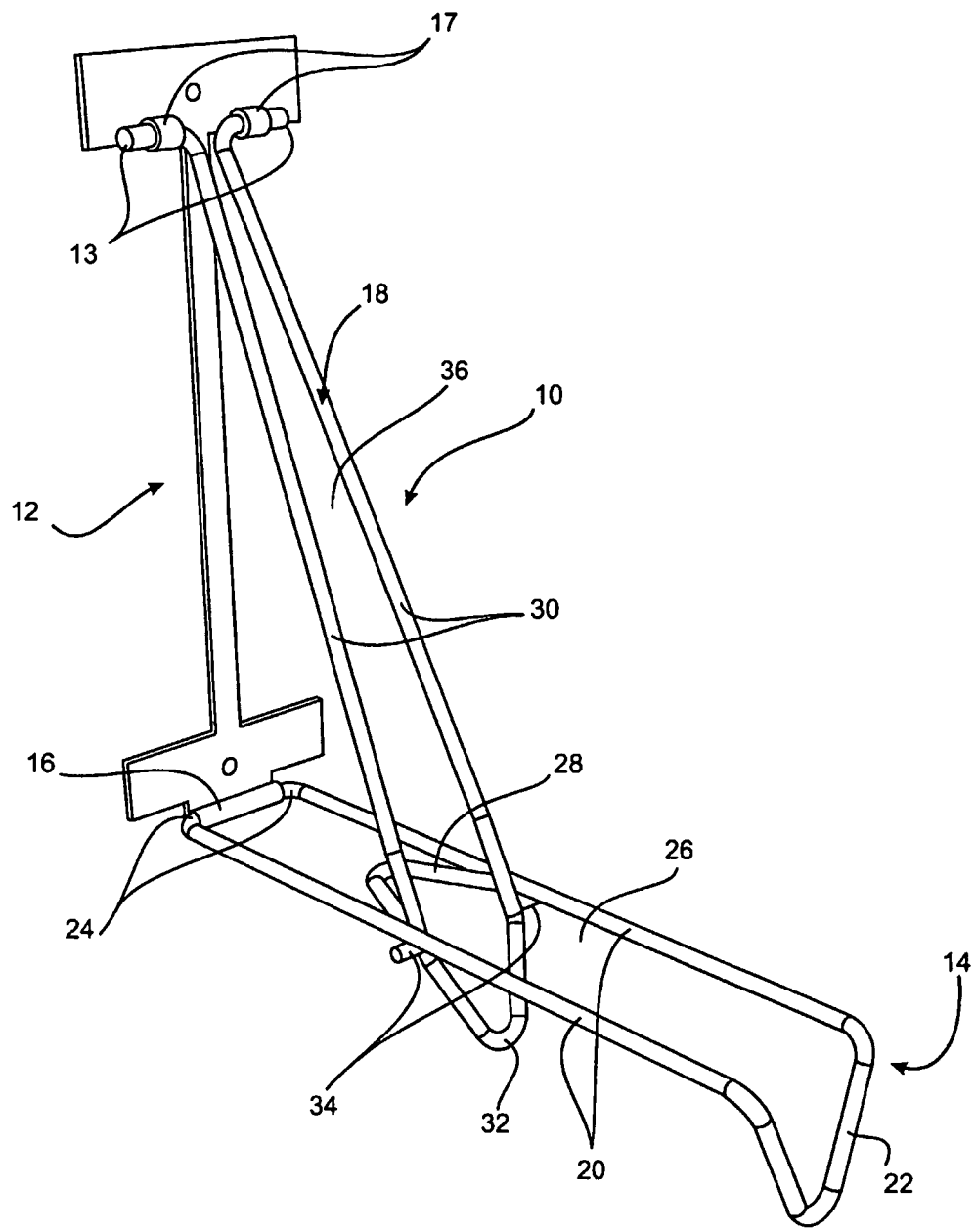
FIG. 2 is a perspective elevation view of bicycle rack according to the first embodiment in an extended condition.
Figure 3:
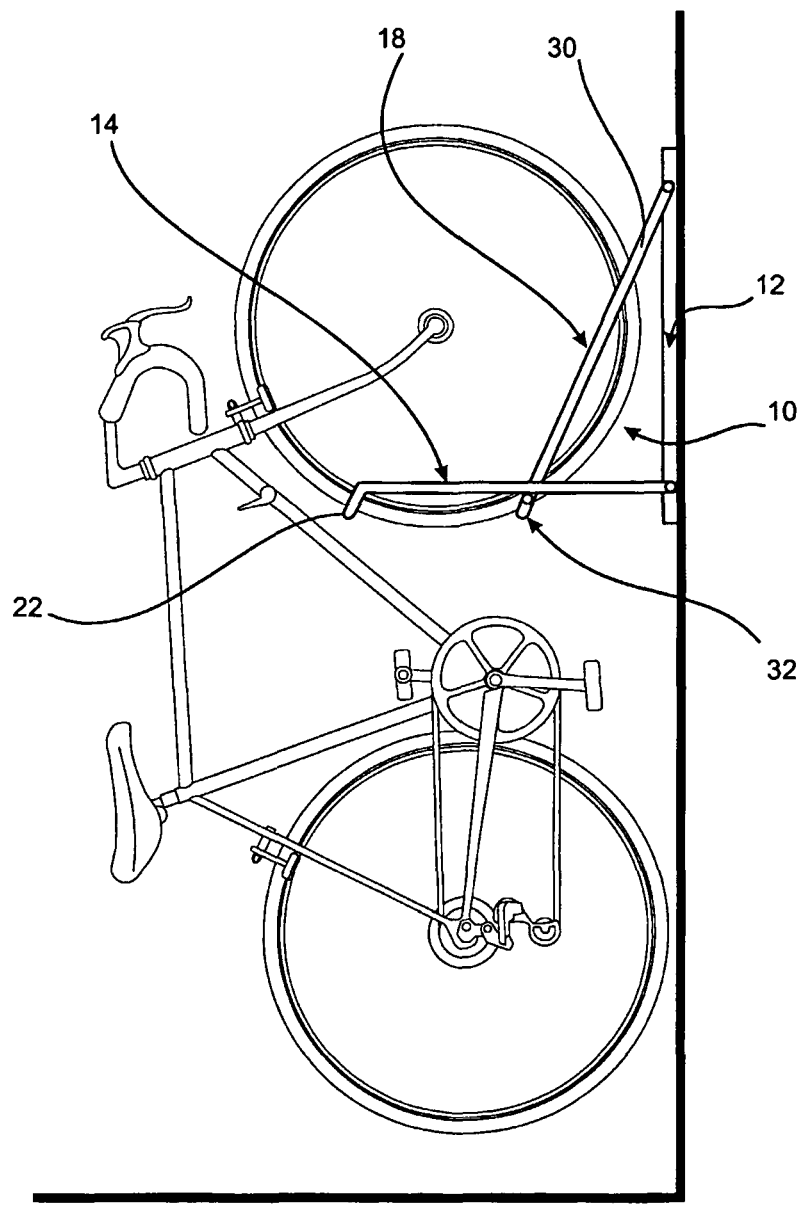
FIG. 3 is a side elevation view of bicycle rack according to the first embodiment supporting a bicycle.

In the case of the first embodiment (as shown at FIGS. 1 to 3), the rack 10 comprises a generally planar base 12 which is adapted to be mounted, by conventional means, to a wall However if desired, the rack could be supported from a post, pillar or like element having an upstanding surface.

The rack of the first embodiment 10 further comprises a support member 14 which is pivotally supported from the base 12 through a hinge housing 16 to be pivotable, about a generally level axis, between a first position at which it is adjacent to the wall (as shown FIG. 1) and a second position at which position it extends laterally from the wall (as shown FIG. 2) to be able to receive and support a bicycle wheel.

The support member 14 is formed from a single length of rod material which is bent to provide a pair of parallel elongate arms 20 which are spaced from each other to provide a first space between themselves, where the free end portions 24 of the arm at inner edge of the support member are pivotally received in the hinge housing 16. The other ends of the arms are outermost and are interconnected by a bridging portion which defines the outer edge 22 of the support member. The outer edge 22 has a concave profile which is downwardly directed, when the support member is in the second position as shown at FIGS. 2 and 3 and which is intended to serve as a guide for the wheel of a bicycle which is to be supported by the rack 10. The support member 14 further comprises a cross-member 28 which extends between the arms 20 of the support member 14 intermediate of the length of the support member 14. The cross-member 28 has a V-shaped configuration and is to be generally coplanar with the support member. The arms 20, outer edge 22 and cross member 28 define a closed first space 26 having the configuration of a slot which is dimensioned to receive a portion of the wheel of the bicycle to be supported from the rack 10 whereby the outer periphery of the wheel is engaged at two angularly spaced positions around the perimeter of the wheel by the outer edge 22 and cross-member 28.

The rack 10 further comprises a brace member 18 which provides support for the support member 14 when in its second position. The brace member 18 is also pivotally supported from the base 12 and is also formed from a single length of rod material bent at its mid-point to provide a pair of arms 30 where the free ends 13 of the arms 30 are pivotally supported from the base 12 by a pair of second hinge sleeves 17. The other ends of the arms 30 are interconnected by a second bridging portion 32. The brace member 18 is received in the first space 26 and the outer ends of the arms 30 each support a laterally outwardly directed stop member 34 which is intended to receive and support the undersurface of arms 20 of the support member 14. The arms of the brace member defines between themselves a second space which combines with the first space 26 of the support member to receive the wheel of the bicycle.

The interengagement between the support member 14 and brace member 18 is such that movement of the support member 14 from its first position to its second position effects corresponding movement of the brace member 18.

In use, and as shown at FIG. 3, the front wheel of a bicycle is receivable in the first and second spaces of the support member and the brace member the remainder of the bicycle is suspended from the front wheel. To mount a bicycle to the rack 10, the support member 14 is pivoted to its second position and the front wheel of the bicycle is raised from the ground such that it is generally located above the rear wheel and when in this position the front wheel is engaged with the outer edge 22 of the support member 14. In this regard, the rack 10 is to be mounted at a height such that the front wheel will engage the outer edge 22 of the support member 14 when the front wheel has been raised from the ground but while the rear wheel of the bicycle remains in contact with the ground. With a force being applied to the bicycle to push it towards the base, the outer edge 22 engages the front wheel of the bicycle and the wheel rolls over the outer edge to lift the bicycle and move into the first space 26 defined by the support member and the second space defined by the brace member. Because of the leverage function of the front wheel when engaged with the outer edge 22 the user is not required to accommodate for the full weight of the bicycle when moving into and out of engagement with the first and second spaces since much of the weight of the bicycle is borne by the support member through the outer edge 22.

Figure 4:
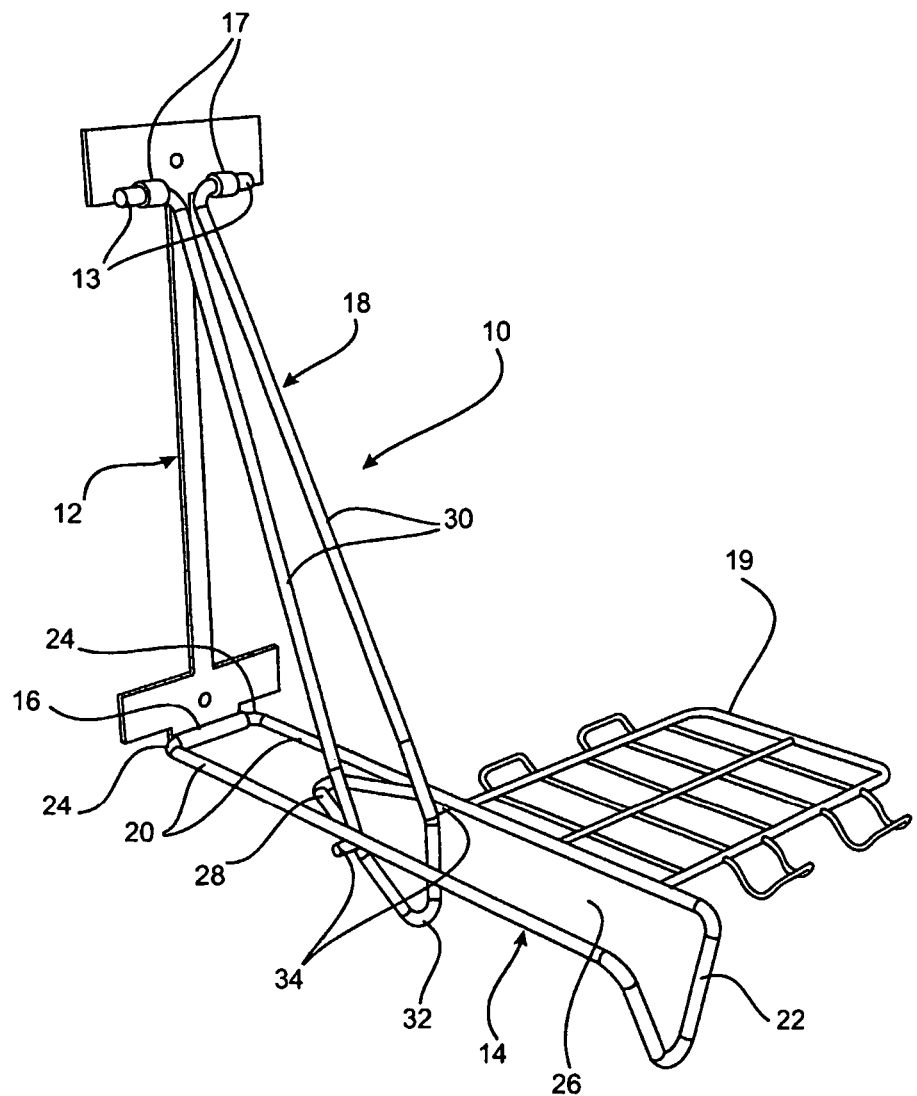
FIG. 4 is a perspective elevation view of a bicycle rack according to the second embodiment of the invention in an extended condition.

The second embodiment, as shown at FIG. 4 (the same reference numerals will be used to denote corresponding components), is identical to the first embodiment but also includes a removable shelf 19 supported from one of the arms 20 of the support member 14. The shelf 19 is generally coplanar with the arms 20 so that, when the support member 14 is in its first position, the shelf 19 lies adjacent to the wall and does not appreciably protrude therefrom. The shelf 19 may be utilised for storage of additional items, for example helmets and/or other cycling gear when the support member is in its second position.

Figure 5:
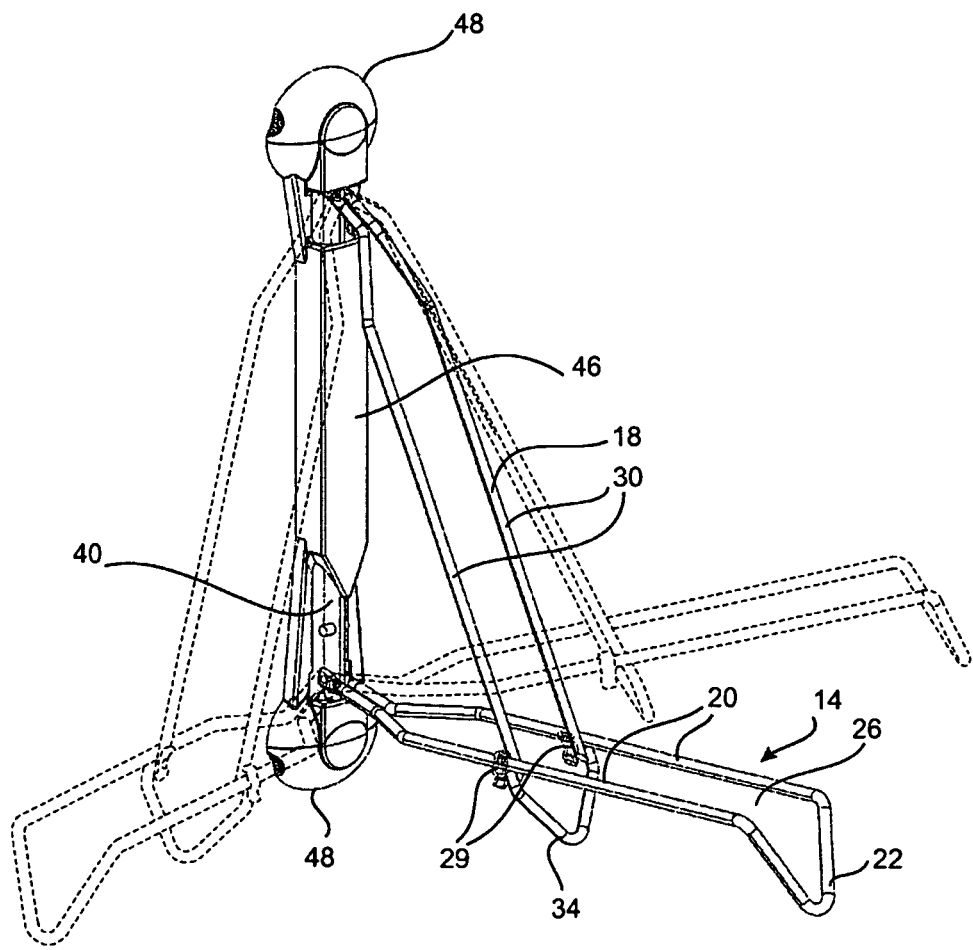
FIG. 5 is a perspective elevation view of a bicycle rack according to the third embodiment in an extended condition.
Figure 6:
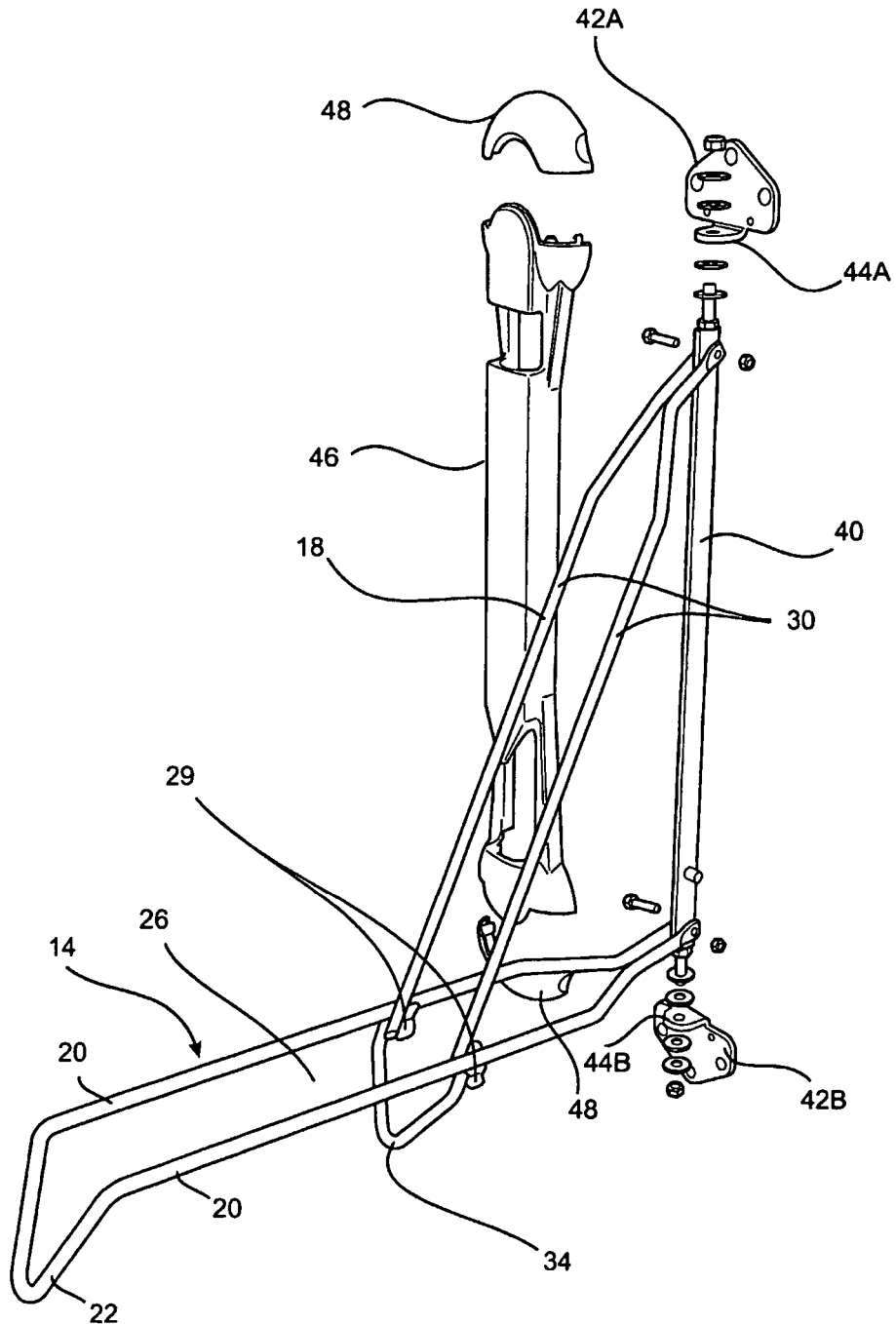
FIG. 6 is a perspective elevation view of a bicycle rack according to the third embodiment in an extended condition with the shroud and mounting shown in an exploded form.
Figure 7:
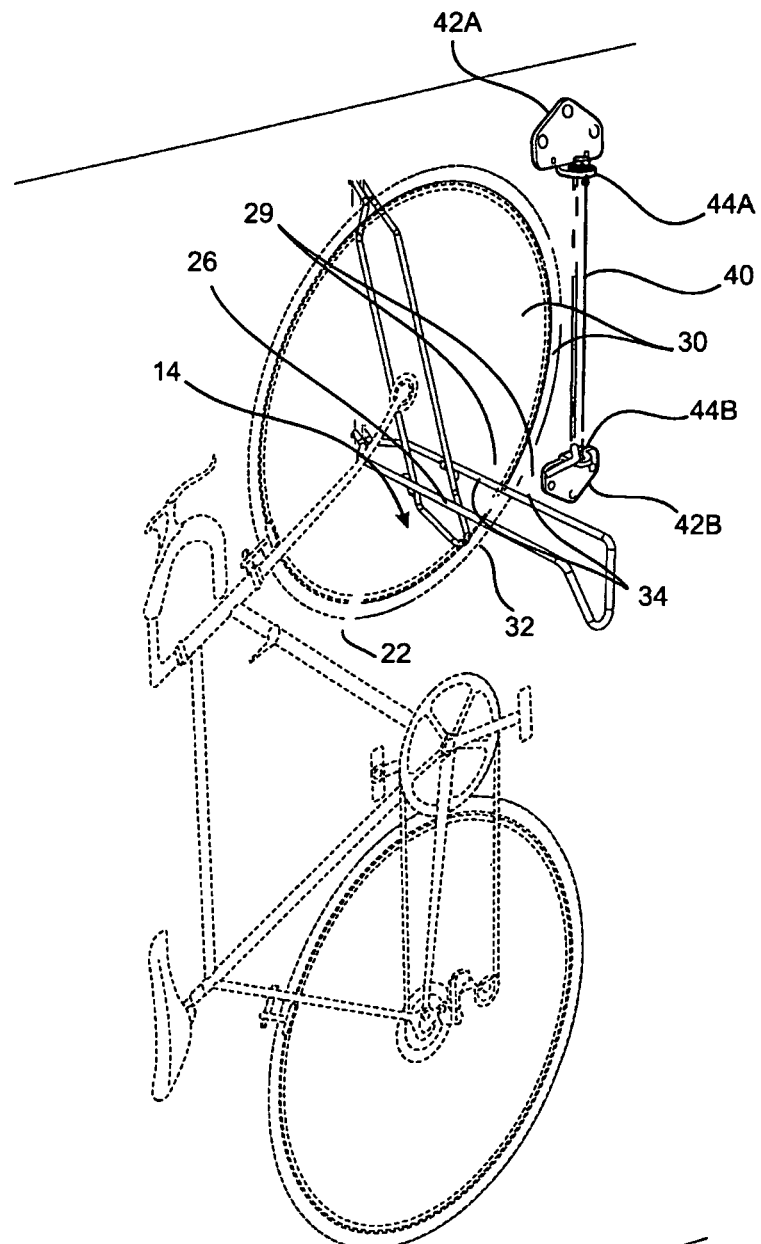
FIG. 7 is a side elevation view of the bicycle rack according to the third embodiment supporting a bicycle.

The third embodiment, as shown at FIGS. 5, 6 and 7 (the same reference numerals will be used to denote corresponding components), is a variation of the first embodiment in that the support member 14 and brace member 18 are not only pivotable about generally level axes, but also are pivotable about a generally upright axis. To this end, the base 12 comprises an elongate member 40 from which the support member 14 and brace member are pivotally supported. The elongate member 40 is supported at each end by mounting brackets 42A and 42B through a pivot plates 44A and 44B respectively. The brackets 42A and 42B are adapted to be fixed to the wall The third embodiment further comprises a shroud 46 and end caps 48 which jointly cover the brackets 42A and 42B and the elongate member 40 and which serves to enhance the appearance of the rack 10.

In addition, the first space 26, defined between the arms 20 of the support member 14, is not defined at its inner end by a cross-member, as in the case of 30 the first and second embodiments, but rather by forming the inner ends of the arms to be inwardly convergent. In addition, the brace member 18 is slidably engaged with the arms 20 of the support member 14 through a pair of opposed lugs 29 on the arms 20 of the support member which limit the slidable movement of the brace member along the space. Each of the arms 30 are formed towards their lower ends with outwardly directed formations 34 which engage with the underneath of the arms 20 of the support member 14. Because the lugs 29 are located intermediate of the length of the space 26, the brace member provides additional support through the engagement of the formations 34 with the underneath of the support member, for the wheel of the bicycle when supported from the support member. In addition the brace serves to limit the pivotal movement of the wheel about the central axis of the space 26.

As illustrated in FIG. 5 the pivoting facility offered by the elongate member 40 enables the support member 14 and brace member 18, and the bicycle supported thereby, to be jointly moved between a position to either side of the support brackets 42A and B close to the upstanding a wall (as shown in broken lines at FIG. 5) and a position extending outwardly from the wall (as shown in solid lines at FIG. 5). This reduces the extent to which the stored bicycle extends from the wall to provide a space-saving advantage.

In a further embodiment, the brace member extends upwardly from the base to the support member, to support the support member in its second position.

Owing to the generally planar nature of the support member, brace member and base of each embodiment, the rack in its collapsed condition (i.e. when the bracing and support members are in their first positions) does not protrude laterally to an appreciable extent, thereby offering a space-saving advantage.

Throughout the specification, unless the context requires otherwise, the word "comprise" or variations such as "comprises" or "comprising", will be understood to imply the inclusion of a stated integer or group of integers but not the exclusion of any other integer or group of integers.

It should be appreciated that the scope of the present invention need not be limited to the particular scope of the embodiments described above. In particular the invention is not restricted in its scope to the storage of bicycles but can have application to the storage of other articles such as surfboards, canoes and the like. In addition the support can comprise any structure which enables the rack to be mounted such that it can receive an item and in the case of a rack intended to support a bicycle can include a support adapted to be mounted to a vehicle to facilitate the transport of the bicycle The claims defining the invention are as follows:

1. A bicycle rack intended in use to be supported from a support, the rack comprising:
   a base adapted to be fixed to the support;
   a support member having an outer and an inner edge, the inner edge of the support member being connected to the base to enable the support member to be pivotable about a first axis that is substantially horizontal and the outer edge having a first wheel support structure, the support member being moveable between a first position, at which the support member is upwardly adjacent to the support, and a second position at which the support member extends laterally from the support, the support member pivotable about a third axis between the second position and a third position at which the support member is substantially laterally adjacent the support, the third axis being substantially perpendicular and coplanar with respect to the first axis;
   a brace member comprising at least one bracing arm disposed between the base and the support member, and a second wheel support structure, the brace member adapted to support the support member when the support member is in the second position;
   wherein the second wheel support structure is disposed substantially intermediate the first wheel support structure and the inner edge of the support member and wherein the first wheel support structure and the second wheel support structure are adapted to receive and support therebetween a portion of a wheel of a bicycle with spaced clearance from the support when the support member is in the second position such that the support member is pivotally displaceable between the second position and the third position when operatively supporting a bicycle.

2. A bicycle rack as claimed at claim 1 wherein the support member is provided with a slot shaped first space between the inner edge and the outer edge, wherein the first space is configured to receive the portion of the wheel.

3. A bicycle rack as claimed at claim 2 wherein the outer edge of the support member defines the outer end of the first space.

4. A bicycle rack as claimed at claim 3 wherein the outer end of the first space is closed.

5. A bicycle rack as claimed at claim 4 wherein the outer edge of the support member defines the closed outer end of the first space and the outer edge provides the first wheel support structure which comprises a guide and support surface for the wheel on its movement into and out of the first space.

6. A bicycle rack as claimed at claim 5 wherein the upper surface of the outer edge has a concave profile.

7. A bicycle rack as claimed at claim 3 wherein the inner end of the first space is defined by a transverse surface.

8. A bicycle rack as claimed at claim 7 wherein the transverse surface is provided by a cross member extending across the inner end of the first space.

9. A bicycle rack as claimed at claim 1 wherein the brace member is pivotally supported from the base for pivotable movement about a second axis, the first and second axes being parallel and spaced from each other, the brace member being moveable with the support member such that, when the support member is in its second position, the brace member supports the support member.

10. A bicycle rack as claimed at claim 9 wherein the support member and brace member are interengaged outward of their pivotable mountings such that movement of the support member causes the pivotable movement of the brace member.

11. A bicycle rack as claimed at claim 9 wherein the brace member is provided with a second space which cooperates with the first space defined by the support member to provide a combined space which is configured to receive the portion of the wheel, wherein the second space provides an upright extent to the combined space while the first space provides a lateral extent to the combined space.

12. A bicycle rack as claimed at claim 1 wherein the rack further includes a storage shelf supported from a side of the support member to extend transversely outward from the support member.

13. A bicycle rack as claimed at claim 1 wherein the support member is pivotable relative to the base about a third axis generally parallel to the support.

14. A bicycle rack supported from an upstanding support, the rack comprising:
   a base fixed to the support;
   a support member having an outer edge and an inner edge, the outer edge having a first wheel support structure and the inner edge of the support member connected to the base to enable the support member to be pivotable about a first axis which is substantially horizontal, to be moveable between a first position, at which the support member is upwardly adjacent to the support, and a second position at which the support member extends laterally from the support, and the support member pivotable about a third axis between the second position and a third position at which the support member is substantially laterally adjacent to the support, the third axis being substantially perpendicular and coplanar with respect to the first axis;
   a brace member comprising at least one bracing arm disposed between the base and the support member, and a second wheel support structure, the brace member adapted to support;
   wherein the second wheel support structure is disposed substantially intermediate the first wheel support structure and the inner edge of the support member and wherein the first wheel support structure and the second wheel support structure are adapted to receive and support therebetween a portion of a wheel of a bicycle with spaced clearance from the support when the support member is in the second position such that the support member is pivotally displaceable between the second position and the third position when operatively supporting a bicycle.

15. A bicycle rack as claimed at claim 14 wherein the support member is provided with a first space which is adapted to receive the portion of the wheel between the inner edge and the outer edge.

16. A bicycle rack as claimed at claim 15 wherein the outer edge of the support member defines the outer end of the first space.

17. A bicycle rack as claimed at claim 16 wherein the outer end of the first space is closed.

18. A bicycle rack as claimed at claim 17 wherein the outer edge of the support member defines the closed outer end of the first space and the outer edge provides the first wheel support structure which comprises a guide and support surface for the wheel on its movement into and out of the first space.

19. A bicycle rack as claimed at claim 18 wherein the upper surface of the outer edge has a concave profile.

20. A bicycle rack as claimed at claim 15 wherein the inner end of the first space is defined by a transverse surface.

21. A bicycle rack as claimed at claim 20 wherein the transverse surface is provided by a cross member extending across the inner end of the first space.

22. A bicycle rack as claimed at claim 14 wherein the brace member is pivotally supported from the base for pivotable movement about a second axis, the first and second axes being parallel and spaced from each other, the brace member being moveable with the support member such that, when the support member is in its second position, the brace member supports the support member.

23. A bicycle rack as claimed at claim 22 wherein the support member and brace member are interengaged outward of their pivotable mountings such that movement of the support member causes movement of the brace member.

24. A bicycle rack as claimed at claim 22 wherein, the brace member is provided with a second space which cooperates with the first space defined by the support member to provide a combined space wherein the second space provides an upright extent to the combined space while the first space provides a lateral extent to the combined space.

25. A bicycle rack as claimed at claim 14 wherein the rack further includes a storage shelf supported from a side of the support member to extend transversely outwardly from the support member.

26. A bicycle rack as claimed at claim 14 wherein, the support member is pivotable from the base about a generally upright axis.

27. A bicycle rack as claimed at claim 5, wherein the outer edge provides a leverage point to assist in moving the bicycle into and out of engagement with the first space.

28. A bicycle rack according to claim 11, wherein the second space converges at an upper end of the lateral extent, such that in use the wheel is grippingly engaged by the brace member.

29. A bicycle rack as claimed at claim 1, wherein the support member and brace members are pivotable relative to the base about a third axis generally parallel to the support.

30. A bicycle rack as claimed at claim 7, wherein the transverse surface limits forward movement of the bicycle when in engagement with the first space.

31. A bicycle rack as claimed at claim 30, wherein the transverse surface is located such that in use the bicycle is positioned a distance from the support such that the support member is pivotal about the generally third axis when the rack supports a bicycle.

32. A bicycle rack as claimed at claim 7, wherein the transverse surface aligns with the brace members.

33. A bicycle rack as claimed at claim 18, wherein the outer edge provides a leverage point to enable the bicycle to be moved into and out of engagement with the first space.

34. A bicycle rack according to claim 23, wherein the second space converges at an upper end of the upright extent, such that in use the wheel is grippingly engaged by the brace member.

35. A bicycle rack as claimed at claim 14, wherein the support member and brace members are pivotable relative to the base about a generally upright axis.

36. A bicycle rack as claimed at claim 20, wherein the transverse surface limits the forward position of the bicycle when in engagement with the first space.

37. A bicycle rack as claimed at claim 36, wherein the transverse surface is located such that the bicycle is positioned a distance from the support such that the support member is pivotal about the generally upright axis when the rack supports a bicycle.

38. A bicycle rack as claimed at claim 20, wherein the transverse surface aligns with the brace members.

39. A bicycle rack intended in use to be supported from a vertical or inclined support, the rack comprising:
a base adapted to be fixed to the support;
a support member having an outer edge and an inner edge, the inner edge of the support member being connected to the base such that the support member is pivotable about a first axis which in use is generally level and the outer edge having a first wheel support structure, and a second axis which in use is parallel to the support;
the support member being moveable between a first position, at which the support member is adjacent to the support and a second position at which the support member extends laterally from the support, and the support member pivotable about a third axis between the second position and a third position at which the support member is substantially laterally adjacent the support, the third axis being generally perpendicular and coplanar with respect to the first axis;
a brace member comprising at least one bracing arm disposed between the base and the support member, and a second wheel support structure, the brace member adapted to support the support member is in the second position;
wherein the second wheel support structure is disposed generally intermediate the first wheel support structure and the inner edge of the support member and wherein the first wheel support structure and the second wheel support structure are adapted to receive and support therebetween a portion of a wheel of a bicycle with spaced clearance from the support when the support member is in the second position such that the support member is pivotally displaceable between the second position and the third position when operatively supporting a bicycle.

40. A bicycle rack as claimed at claim 39, wherein the support member is pivotal relative to the base at an axis generally parallel to the support.

41. A bicycle rack as claimed at claim 40, wherein the support member comprises a transverse member located between the outer edge and the inner edge, the transverse member providing the forward position of the wheel portion when received in the support member, the transverse member being positioned such that the bicycle is supported a distance from the support, enabling the support member to be pivoted relative to the base when the bicycle is supported thereon.

* * * * *